US006109183A

United States Patent [19]

Papritz et al.

[11] Patent Number: 6,109,183

[45] Date of Patent: Aug. 29, 2000

[54] MEASURING FIELD BLOCK FOR DETECTING QUALITY DATA IN THE MULTICOLOR PRINTING OF SINGLE EDITIONS

[75] Inventors: Stephan Papritz, Rubigen; Karl Heuberger, St. Gallen; Hansjörg Künzli, St. Gallen; Markus Dätwyler, St. Gallen, all of Switzerland

[73] Assignee: Maschinenfabrik Wifag, Switzerland

[21] Appl. No.: 08/935,018

[22] Filed: Sep. 22, 1997

[30] Foreign Application Priority Data

Sep. 23, 1996 [DE] Germany ............ 196 39 014
Sep. 5, 1997 [DE] Germany ............ 197 38 923

[51] Int. Cl.[7] ............ B41F 1/54; B41F 5/16; G06K 9/00

[52] U.S. Cl. ............ 101/484; 101/181; 382/112; 382/151; 382/167

[58] Field of Search ............ 382/112, 147, 382/151, 167; 101/180, 181, 183, 216, 484, 486

[56] References Cited

U.S. PATENT DOCUMENTS

| | | | |
|---|---|---|---|
| 4,528,630 | 7/1985 | Sargent | 101/181 |
| 4,534,288 | 8/1985 | Brovman | 101/211 |
| 4,852,485 | 8/1989 | Brunner | 101/211 |
| 4,975,862 | 12/1990 | Keller et al. | 382/112 |
| 5,068,810 | 11/1991 | Ott | 382/112 |
| 5,124,927 | 6/1992 | Hopewell et al. | 364/468.28 |
| 5,182,721 | 1/1993 | Kipphan et al. | 382/112 |
| 5,249,139 | 9/1993 | Blasius | 382/112 |
| 5,696,890 | 12/1997 | Geissler et al. | 395/109 |
| 5,724,437 | 3/1998 | Bucher et al. | 382/112 |
| 5,730,470 | 3/1998 | Papritz | 283/114 |
| 5,761,327 | 6/1998 | Papritz | 382/112 |
| 5,813,333 | 9/1998 | Ohno | 101/181 |

FOREIGN PATENT DOCUMENTS

| | | |
|---|---|---|
| 0 196 431 B1 | 10/1986 | European Pat. Off. . |
| 40 14 706 A1 | 11/1991 | Germany . |
| 44 02 828 A1 | 8/1995 | Germany . |
| 44 02 784 A1 | 10/1995 | Germany . |
| 44 37 603 A1 | 4/1996 | Germany . |

OTHER PUBLICATIONS

Patent Abstracts of Japan M–861 Aug. 18, 1989 vol. 13/No. 373, Japan.

Ulrich Schmitt, Dec. 1995, UGRA/FOGRA Digital–Druckkontrollstreifen.

*Primary Examiner*—Amelia Au
*Assistant Examiner*—Mehrdad Dastouri
*Attorney, Agent, or Firm*—McGlew and Tuttle, P.C.

[57] ABSTRACT

A measuring field block for detecting quality data in the multicolor printing of single editions, which measuring fields (A1–D3) printed on a printed product in an optically scannable manner with at least one color-measuring surface (F) for determining a color density, a surface coverage or a tristimulus value for each of the measuring fields (A1–D3), is characterized in that the measuring field block has lines (L) for primary colors used in the print for the simultaneous determination of values for a register deviation.

17 Claims, 8 Drawing Sheets

MEASURING FIELD BLOCK FOR DETECTING QUALITY DATA IN THE MULTICOLOR PRINTING OF SINGLE EDITIONS

FIELD OF THE INVENTION

The present invention pertains to a measuring field block and to a process for detecting quality data in the multicolor printing of single editions and more particularly relates to a measuring field block which has said optically scannable measuring fields printed on a printed product with at least one color-measuring surface for determining a color density, a surface coverage or a tristimulus value for each of the measuring fields and a process in which the measuring fields and the lines are optically scanned, and the remitted light is evaluated.

BACKGROUND OF THE INVENTION

Numerous solutions have been known for detecting quality data in the multicolor printing of single editions, especially in job printing and newspaper printing. The detection of quality data, e.g., of tristimulus, ink layer thickness, register, shifting and doubling values, surface coverages and the like, is used to monitor and control the coloration in multicolor printing.

A process for achieving a uniform print result on an autotypically operating multicolor offset printing press has been known from EP 0 196 431 B1. Ink layer thicknesses and full tone densities and half-tone dot sizes or surface coverage degree, which are printed simultaneously for each printing ink in each color-setting zone of the printing press, are measured here in measuring fields. The color-controlling adjusting members of the printing press are set automatically based on the densitometric measured values. Since a plurality of measuring fields are printed simultaneously in each color-setting zone of the press, this process is suitable for job offset printing, it is not suitable for newspaper offset printing, in which the measuring fields are printed simultaneously within the printing area, contrary to the job offset printing, and they cannot be cut off after the printing. Newspaper publishers are therefore reluctant to accept these measuring fields.

The high cost of the apparatus and manpower that is needed for measuring the measuring fields can be considered to be another obstacle to the use of this prior-art process in newspaper offset printing. If the measurement is to be performed in web offset printing on-line, i.e., automatically on the running web, an optical measuring head with automatic positioning is needed for each side of the web. If the measurement were performed with commercially available manual densitometers or manual spectrophotometers, instead, personnel would have to be provided specifically for the purpose of detecting quality data in light of the large number of measuring fields and the time required for the manual positioning of the measuring device. Furthermore, the features measured according to this prior-art process in the form of the full-tone and half-tone densities of the individual colors contain little information on the color appearance of the finished multicolor printed product, even though they are directly related to the printing process.

Data on the color sensation can be obtained by printing simultaneously and colorimetrically measuring combination measuring fields, as it has been known especially from DE 44 02 784 A1 and DE 44 02 828 A1. The space requirement for the measuring field or measuring field block printed simultaneously on the printed product to be checked is markedly reduced due to the use of the measuring field block described there. However, this measuring field or the measuring field block known from this does not yet make it possible to record measured values for color uptake in multicolor printover, on the register mark or even for determining disturbances in the printing process, such as shifting and doubling.

Processes for detecting register mark errors and for measuring suitable register marks have been known from DE 44 37 603 A1 and DE 40 14 706 A1. Such register marks would have to be printed in addition to the color marks on the printed product to be checked and be measured with a corresponding measuring device. At least two measuring devices must be controlled and used here.

Another problem arises in connection with the progressive adoption of Color Management in the printing industry. As is known, the idea behind Color Management is to set color originals in the digital preliminary printing stage independently from output devices and materials. The colors of a color original are described in a calorimetric system of coordinates standardized by the Commission International de l'Eclairage (CIE), such as CIEXZY, CIELAB or CIE-LUV. If multicolor images thus defined are printed out on paper via a system calibrated in the sense of Color Management, it is guaranteed that the color appearance of the printed product will be comparable to the original, independently from the output process used.

Computer color printers, digital color copiers and digital proof devices are now used, among other things, as output systems that can be calibrated. It is desirable to also extend the concept of Color Management to conventional printing processes, such as newspaper offset printing. The functional chain consisting of the preparation of the printing form and the printing process is treated here as any other output device that can be calibrated.

An important prerequisite for this is met with the availability of systems for preparing color profiles of the printing process. One problem still lies in the question of how the new Color Management tools can function in a meaningful manner in conjunction with the checking and control mechanisms (densitometry and colorimetry) specific of the printing process.

When preparing color profiles, it is necessary to print and measure special test patterns under exactly defined conditions. This is expensive, because machine hours and material are consumed in the process. It would be desirable to perform the calibration of the color profiles of the printing process only when it has really become absolutely necessary, rather than preventively. However, there is no tool at present that can decide whether this is the case based on the printing of single editions.

SUMMARY AND OBJECTS OF THE INVENTION

The primary object of the present invention is to improve the detection of quality data in the multicolor printing of single editions, preferably in offset printing, and not only for the job offset printing, but also for newspaper offset printing. The space requirement for the measuring elements or measuring fields necessary for detecting quality data shall be able to be reduced here compared with prior-art solutions, and the expense of the measuring devices shall be able to be kept low.

According to the invention, a measuring field block is provided for detecting quality data in the multicolor printing of single editions. The measuring field block has optically scannable measuring fields printed on a printed product with at least one color-measuring surface for determining a color density, a surface coverage or a tristimulus value for each of the measuring fields. The measuring field block has lines in primary colors used for a print for the simultaneous determination of values for a register deviation.

According to the invention a process is provided for detecting quality data in the multicolor printing of single editions, in which a) said color-measuring fields, which contain at least individual color measuring fields in the primary colors (cyan, magenta, yellow), and which have at least one said color-measuring surface suitable for obtaining tristimulus values or color density values or surface coverages, and lines, are printed on a printed product in the primary colors (cyan, magenta, yellow, black), b) the said measuring fields and the lines are optically scanned, c) the remitted light is evaluated, and d) the measuring fields and the lines are printed in a common measuring field block.

The present invention is based on a measuring field block, which is formed by a plurality of measuring fields, which are suitable for obtaining tristimulus values (tristimulus value measurable), color densities or surface coverages or a combination thereof. Being suitable (or being tristimulus value measurable) means here that the measuring fields are large enough to be able to be measured according to the available measurement techniques for determining these values, i.e., the measuring fields must have color-measuring surfaces of a sufficient size.

According to the present invention, the measuring field block has lines in primary colors, which are used for a print, for the simultaneous determination of at least one value for the register deviation, i.e., a register value. Thus, measuring elements, namely, the measuring fields and the lines, are integrated in the measuring field block, which makes possible a measurement and, based on this, the determination of a register deviation and of densitometric and/or colorimetric values on the same measuring field block. Using a suitable measuring device, the measurement, and, based on this, the determination of such values determining the printed image is possible with a single measurement.

The lines preferably pass through two of the measuring fields of the measuring field block. Assuming an exact register, an unprinted area is especially preferably left directly on both sides of such a line. However, it may also be advantageous to have the adjacent measuring fields, between which a line for determining the register extends, directly join such a line. Thus, adjacent measuring fields of the measuring field block are separated from one another by a line in these two embodiments.

It may also be advantageous for some or all lines for determining the register mark to extend across one or more measuring fields of the measuring field block, especially if the measuring field block has too few measuring fields, to have all lines extend between the measuring fields or directly to the side of the outer measuring fields of the block for the determination of all register values.

At least one line is preferably provided in each of the primary colors for at least one direction, in which a register deviation is to be determined. At least one line is preferably provided for each of the primary colors for the determination of the register deviations in a first direction, and at least one more line is provided for the determination of the register deviation in another direction. At least one line each is preferably provided per primary color in the circumferential direction and in the longitudinal direction of a printing cylinder. It is especially preferable to have an additional line for the primary color used as a reference color for at least one direction, but preferably for two directions, in which a register deviation shall be determined for at least one of the other primary colors. The distance between the two lines of the reference color pointing in the same direction is measured, and it is used to coordinate or calibrate the distances of the lines for the other primary colors pointing in the same direction, which latter distances are measured with the same measuring device.

In addition to their color-measuring surfaces, the measuring fields may have according to the present invention at least one color strip each for determining the register mark and/or shifting and/or doubling, and this color strip, of which there is at least one per measuring field, is printed in the same print together with the color-measuring surface of its measuring field, it is narrow in relation to the dimensions of the color-measuring surface of its measuring field, and it extends at a short lateral distance from the color-measuring surface, likewise in relation to the dimensions of the color-measuring surface.

By measuring the zone or surface between the color-measuring surface and its lateral color strip, a shifting and doubling value for the corresponding printing mechanism can thus be determined on each of the measuring fields according to the present invention with a single scanning, besides a tristimulus value, the color density and/or the surface coverage in the color-measuring surface. It is especially advantageous for the color strip and the color-measuring surface of the individual measuring field to be separated from one another by a color-free zone, because the measurement is most optimal in this case.

Since at least the surface not printed on in the printing process in question between the color-measuring surfaces and their lateral color strips is defined by the color-measuring surface, on the one hand, and the color strip, on the other hand, because of the bilateral border in the case of shifting- and doubling-free printing, the shifting and doubling values can be determined.

Due to the fact that a predetermined border of the zone to be measured is formed by an edge of a color-measuring surface, the combined measurement of the color and shifting/doubling is possible on the same measuring field in a space-saving manner.

In a preferred variant, the measuring fields have at least two such lateral color strips each for determining the shifting and doubling in the circumferential and lateral directions. The zones extend in the circumferential direction and the lateral direction, especially between the color-measuring surfaces and their lateral color strips; two zones thus formed on a single measuring field therefore extend at right angles to one another.

To determine the register values, the relative positions of the measuring fields, preferably the lateral color strips of the individual measuring fields, in relation to one another can be determined in this case, instead of or in addition to the lines between the measuring fields. No additional register marks need to be printed in this case, either, because of the design of the individual measuring fields according to the present invention. Since the zones between the color-measuring surfaces and their lateral color strips are not printed simultaneously during the printing of the corresponding measuring field, the register values can be determined on the measuring fields according to the present invention.

If the measuring field block has the above-mentioned lines and measuring fields and with color strips located at a short distance therefrom laterally, the lines are preferably used to determine the register values, and the color strips are preferably used to determine the shifting and/or doubling values. If the measuring fields contain these color strips, but the above-mentioned lines are not present, which also corresponds to a preferred embodiment, it is still possible to determine the register values and/or shifting values and/or doubling values by means of the color strips.

The measuring fields are preferably at least individual color full-tone fields in the respective primary colors, generally cyan, magenta and yellow for the four-color printing, or corresponding individual color half-tone fields, in which the primary colors are printed with their respective nominal degrees of surface coverage. If both full-tone densities and surface coverages are to be determined, individual color full-tone fields and individual color half-tone fields are printed simultaneously in the primary colors.

A full-tone field in black may also be provided in each of the said combinations. It is also possible to provide, instead of or in addition to this, a half-tone field, in which the color black is printed with its nominal degree of surface coverage.

In another preferred embodiment, combination measuring fields, in which at least two primary colors are printed over each other with their nominal degrees of surface coverage, may be provided in addition to each of the above-mentioned measuring field combinations, so that relevant values can also be obtained for the color uptake behavior.

Finally, an additional combination measuring field, in which all primary colors are printed over each other with their nominal degrees of surface coverage, may also be printed together for each of the above-mentioned measuring field combinations in another preferred embodiment.

The above-mentioned measuring fields or a selection thereof may also be printed individually in the image, i.e., it is not necessary for all of them to be arranged together in a measuring field block according to the present invention.

In a preferred variant, they are arranged and printed together in the form of a single, compact measuring field block, assuming exact register mark, such that the adjacent measuring fields with their color-measuring surfaces or their lateral color strips abut against each other bluntly or at the lines, or there is a short distance between color-measuring surfaces or the color strips or between these and the lines. Mixed forms of all variants are also possible, in which a plurality of measuring fields are arranged in the form of such measuring field blocks and a plurality of such measuring field blocks, each with different measuring fields, are optionally provided; individual fields may also be printed in the image.

Assuming the use of a suitable measuring device, all the values influencing the quality of the printed product, namely, the register values, shifting and doubling values, as well as color density, color uptake and color balance values, tristimulus values, surface coverages, etc., or a desired subcombination can be determined by a single scanning by using a single, compact measuring field block.

In a preferred process for detecting quality data in the multicolor printing of single editions, color measuring fields containing at least individual color measuring fields in the primary colors, preferably in cyan, magenta and yellow, and lines in the primary colors are printed on a printed product, wherein the individual color measuring fields have at least one color-measuring surface suitable for obtaining tristimulus values or color density values or surface coverages. The measuring fields and lines are scanned optically, and the remitted light is evaluated, and register values are obtained by measuring the metric positions of the lines in relation to one another.

To form the measuring fields, at least one color strip each is printed in an alternative embodiment for optionally also determining the register mark, but definitely the shifting and/or doubling in the same print, together with the color-measuring surface of the measuring field, which is narrow in relation to the dimensions of the color-measuring surface of its measuring field and extends at a predetermined, short lateral distance from the color-measuring surface likewise in relation to the dimensions of the color-measuring surface. Shifting and doubling values are obtained by measuring zones thus formed between the color-measuring surface and the color strips of the individual measuring fields.

Image areas of the printed product may advantageously be used as measuring fields.

The measuring fields are preferably recognized by image analysis.

A plurality of measuring fields are preferably printed next to each other in the form of a compact measuring field block such that their lateral color strips facing each other abut against each other bluntly or are located at a predetermined, short distance from one another in the case of a correct register mark.

The image processing process preferably comprises a color separation, the generation of a binary image, and a feature-specific mathematical algorithm for determining the shifting and doubling values, register values and color density values or surface coverages. A diagnosis can be determined based on the quality data obtained in a computer-aided manner.

Measures for improving the print quality are recommended from the diagnosis.

The measures preferably include a compensation of the print characteristics, which is specific of both the material, the printing mechanism and the press.

A correction of the setting of the printing press can be calculated from the diagnosis and the quality data obtained, and the printing press can be controlled with these correction values.

The diagnosis is determined especially preferably according to a decision tree preset in the form of a computer program.

The diagnosis and the optionally performed calculation of a correction of the printing press setting is preferably performed with a neuronal network.

The diagnosis and the optionally performed calculation of a correction of the printing press setting is preferably performed with fuzzy logic.

An especially preferred measuring device has a sensor, preferably a photoelectric sensor, with spectral or at least three-range and two-dimensional steric resolution. A CCD color camera, which is mounted on a microscope, is preferably used.

If the measuring fields are printed simultaneously individually and in suitable subcombinations arranged in measuring field blocks distributed on the image, the quality data of interest can still be determined by means of a single measuring device. The measuring device is arranged in this case displaceably above the printed product passing through. The locations of the measuring fields or measuring field blocks to be scanned are communicated to the process control of the measuring device from the preliminary printing stage.

A preferred embodiment of a measuring field and of a compact measuring field block as well as of two processes for optimizing the color reproduction in the multicolor printing of single editions will be described below on the basis of figures.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
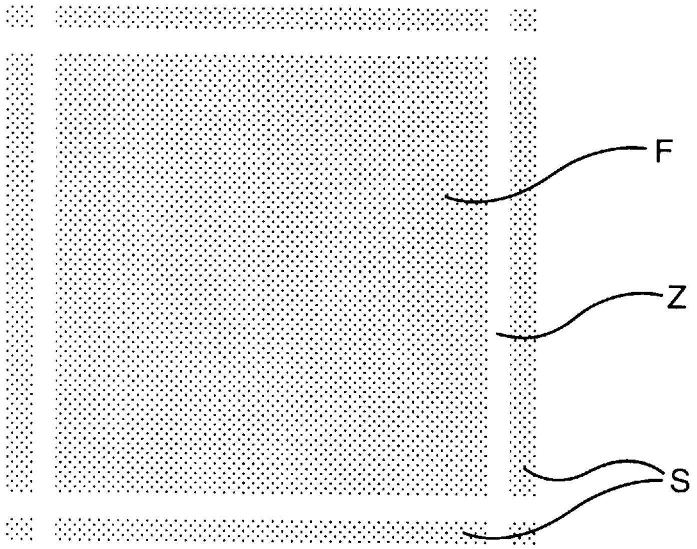
FIG. 1 is a view of a measuring field.

The measuring field shown in FIG. 1 contains a color-measuring surface F with lateral color strips S. The color-measuring surface F has the shape of a square in the exemplary embodiment. One of the narrow, rectangular color strips S extends in parallel to the edges of each of the four sides of the square. A color-free zone Z, i.e., a zone Z that remains color-free at least in the print of the measuring field, and whose width and consequently whose area are exactly predetermined in the case of ideal printing, is formed between the edges of the color-measuring surface F thus limited, on the one hand, and the lateral color strips S, on the other hand. The shifting and doubling values of this print can be determined by comparing this ideal area of the zone Z with the measured partial area of the zone Z not printed during the actual printing. It would be sufficient to provide two color strips S arranged at an angle to one another to determine the shifting and the doubling in the circumferential and lateral directions. The other two color strips S will then only intensify the measured signal in an advantageous manner.

The minimum size of the color-measuring surface F is predetermined by the dot width of the printing process, i.e., the half-tone dot size, taking into account the available resolution of the camera and the steric resolution of the sensor and a sufficiently expressive statistics.

The color-measuring surface F, which is quadratic in the exemplary embodiment, may also be only rectangular within the scope just set here, and it may also have basically any desired shape, but a shape predetermined in a defined manner. It is also not absolutely necessary for the color strips S to extend in parallel to the edges, but the color-free zones Z must also be predetermined, defined by their borders, assuming ideal printing. However, the shape of the measuring field shown facilitates the analysis of the measurement results following the actual scanning of the measuring field. This shape is also especially suitable for combining a plurality of such measuring fields into a compact measuring field block.

Figure 2A:
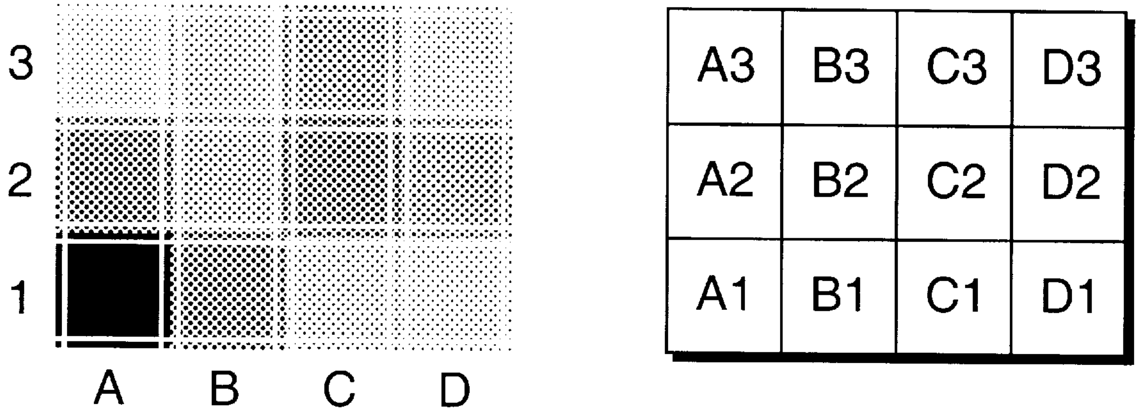
FIG. 2A is a view of a compact measurig field block with measuring fields arranged next to each other according to FIG. 1.

Such a compact measuring field block is shown in FIG. 2A. In the exemplary embodiment, it comprises 12 measuring fields, which are combined in a 3×4 grid-like measuring field block. The individual measuring fields are designated by A1 through D3.

Figure 2B:
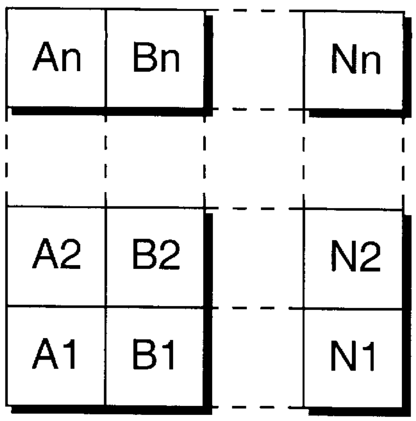
FIG. 2B is a generalization of the measuring field block according to FIG. 2A.
Figure 2C:
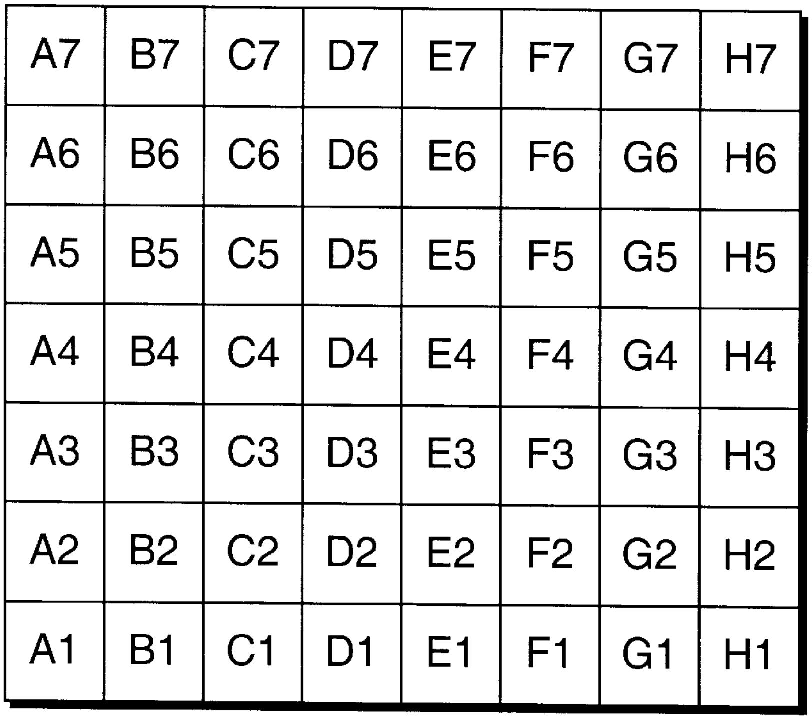
FIG. 2C is a schematic view of a compact measuring field block for eight-color printing.

The compact measuring field block for the multicolor printing in general, i.e., for any desired number of primary colors, is shown in FIG. 2B. An exemplary measuring field block for the eight-color printing is finally shown in FIG. 2C. The measuring field bock according to FIG. 2A for the four-color printing will always be referred to below as an example.

Figure 2D:
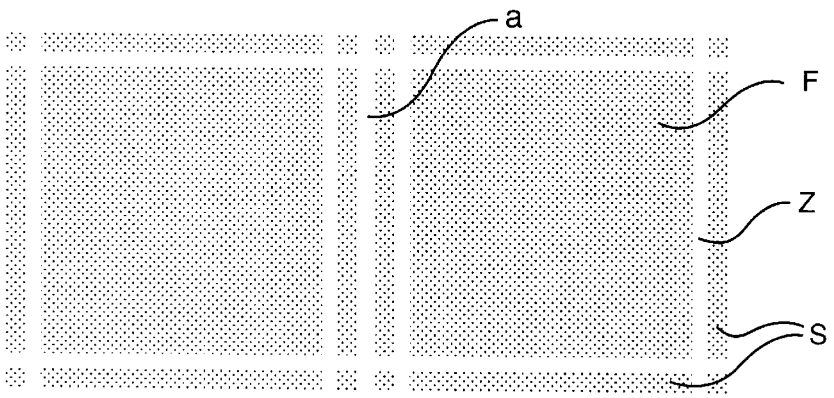
FIG. 2D is a schematic view of two measuring fields of a measuring field block arranged next to each other.

Two adjacent measuring fields A1 through D3 bluntly abut against each other with their lateral color strips S or with a predetermined distance "a" in the compact measuring field block, if no register mark deviations occur in the print, corresponding to the ideal case. FIG. 2D shows two measuring fields, which are printed next to each other such that their color strips 3 facing each other are located at a short distance a from each other. In the case of an ideal register mark, a should be between 0 and a maximum of 400 $\mu$m. A distance formed between the lateral edge of the measuring surface F and the corresponding adjacent strip S does not advantageously exceed about 0.1 mm, so that even though the measuring field has small dimensions, shifting and/or doubling can nevertheless be determined to the full extent.

In the measuring field block according to FIG. 2A, the measuring field A1 is formed by a full-tone field in black. The measuring field A2 is a half-tone field, in which the color black is printed with its nominal degree of surface coverage. The measuring field B1 is a combination measuring field, in which the three primary colors cyan, magenta and yellow are printed over each other with their respective nominal degrees of surface coverage. The measuring fields A3, B2 and C1 are formed by individual color half-tone fields with nominal degrees of surface coverage in the three primary colors. The three primary colors are printed individually in full tone in the measuring fields B3, C2 and D1. Finally, the remaining measuring fields C3, D2 and D3 are additional combination measuring fields, in which two of the primary colors are printed over each other with nominal degrees of surface coverage. The color black can also be called a primary color, i.e., the fourth primary color in this case.

In newspaper printing as the preferred example of application, the measuring fields A1 through D3 have an extension of about 1.65×1.65 $mm^2$, and the compact measuring field block with 12 such measuring fields has an extension of 6.6×5 $mm^2$. The miniaturized measuring fields thus formed are printed simultaneously in selected image areas or, as is shown, as a compact measuring field block on a printed product to be checked, and they are subsequently recorded in-line, on-line or off-line by means of a CCD color camera mounted on a microscope. It would also be possible to perform the recording in one or more image areas by using a photoelectronic sensor with spectral and two-dimensional steric resolution.

The images recorded are digitized and subsequently evaluated directly by means of software, using a feature-specific algorithm. The data may also be separated according to the individual colors, and the binary image thus generated may be evaluated with a corresponding, feature-specific mathematical algorithm. A combination of the two processes is possible as well.

In the exemplary embodiment, the color strips S of the measuring fields B3, C2, D1 and A1 are used to determine the register mark of cyan, magenta, yellow and black in the circumferential direction and the lateral direction. The relative positions of the measuring fields C2, D1 and A1 for magenta, yellow and black and consequently any possible deviations of the register mark are determined starting from the measuring field B3 of cyan. Shifting and doubling are determined by the fact that an unprinted zone Z is measured in these measuring fields between the color-measuring surface F and the color strips S.

The color-measuring surfaces F of the same measuring fields B3, C2, D1, A1 are used to determine the full-tone densities of the corresponding colors.

The degrees of surface coverage of black, yellow, magenta and cyan are determined by means of the measuring fields A1, C1, B2 and A3. It would also be possible to determine the register and shifting as well as doubling values by means of these individual color half-tone fields.

The measuring fields C3, D3 and D2, in which two of the three primary colors yellow, magenta and cyan each are printed over each other in half-tone, and the measuring field B1, in which all three primary colors are printed over each other in half-tone, are used to determine the tristimulus values and the color uptake in the two-color and three-color printover.

Qualitatively intensified signals can be generated for shifting, doubling and the register mark due to the specific combination of individual measuring fields, e.g., by the combination of the measuring fields B1, C1 and D1 for the primary color yellow with B2, C2 and D2 for the primary color magenta.

A preferred image processing comprises a photoelectric sensor with spectral and two-dimensional steric resolution as well as image analysis hardware and software, which may, however, basically also be formed by a permanently wired hardware, and a digital computer, preferably a personal computer. The relevant image areas of the compact measuring field block are selected by means of image analysis for the sensor signals recorded, and the recorded signals are transformed into XYZ values and subsequently into LAB values and density values by means of, e.g., matrix operations.

The recorded signals are separated into binary images for the determination of the surface coverages and of the register mark, and they are subsequently evaluated by means of a feature-specific algorithm.

By printing simultaneously the compact measuring field block according to FIG. 2A, the features necessary for the product qualification and possibly for a diagnosis can be determined on the printed product by the use of image analysis for the evaluation of the measured data and of the image recorded by means of a single scanning process in a very small area in the printing area. It is thus possible to obtain an extraordinarily larger number of quality features in a very short time.

Six register values, four full-tone density values, four tonality increase values, three color uptake values for the primary colors, four shifting and doubling values, as well as four color location vectors and four color distances of the secondary and tertiary chromatic colors, i.e., a total of 29 measured values or characteristics, can be determined per scanning of the compact measuring field block in the example shown for the four-color printing.

Figure 3:
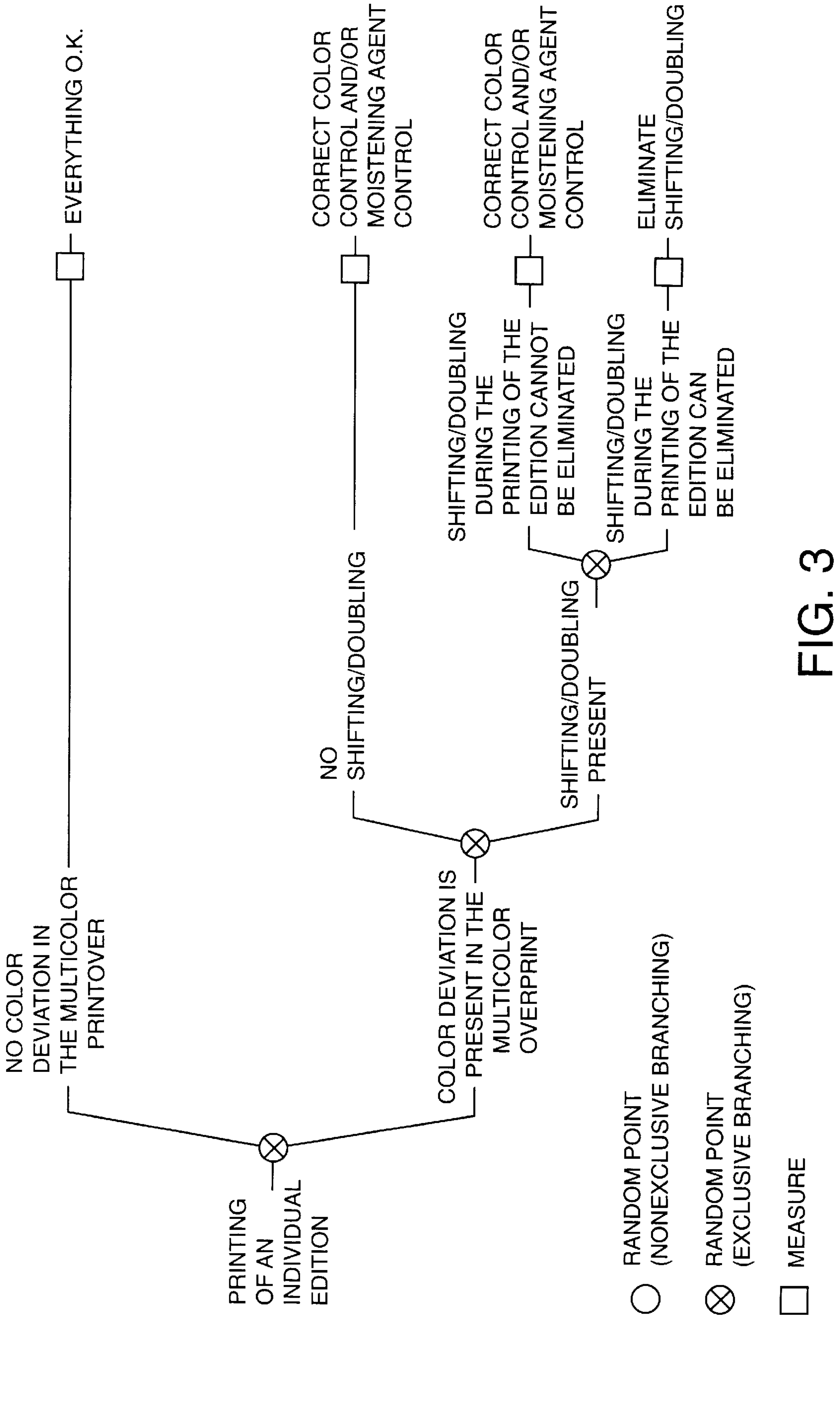
FIG. 3 is a decision tree optimizing the color reproduction reproduction in a single edition.
Figure 4A:
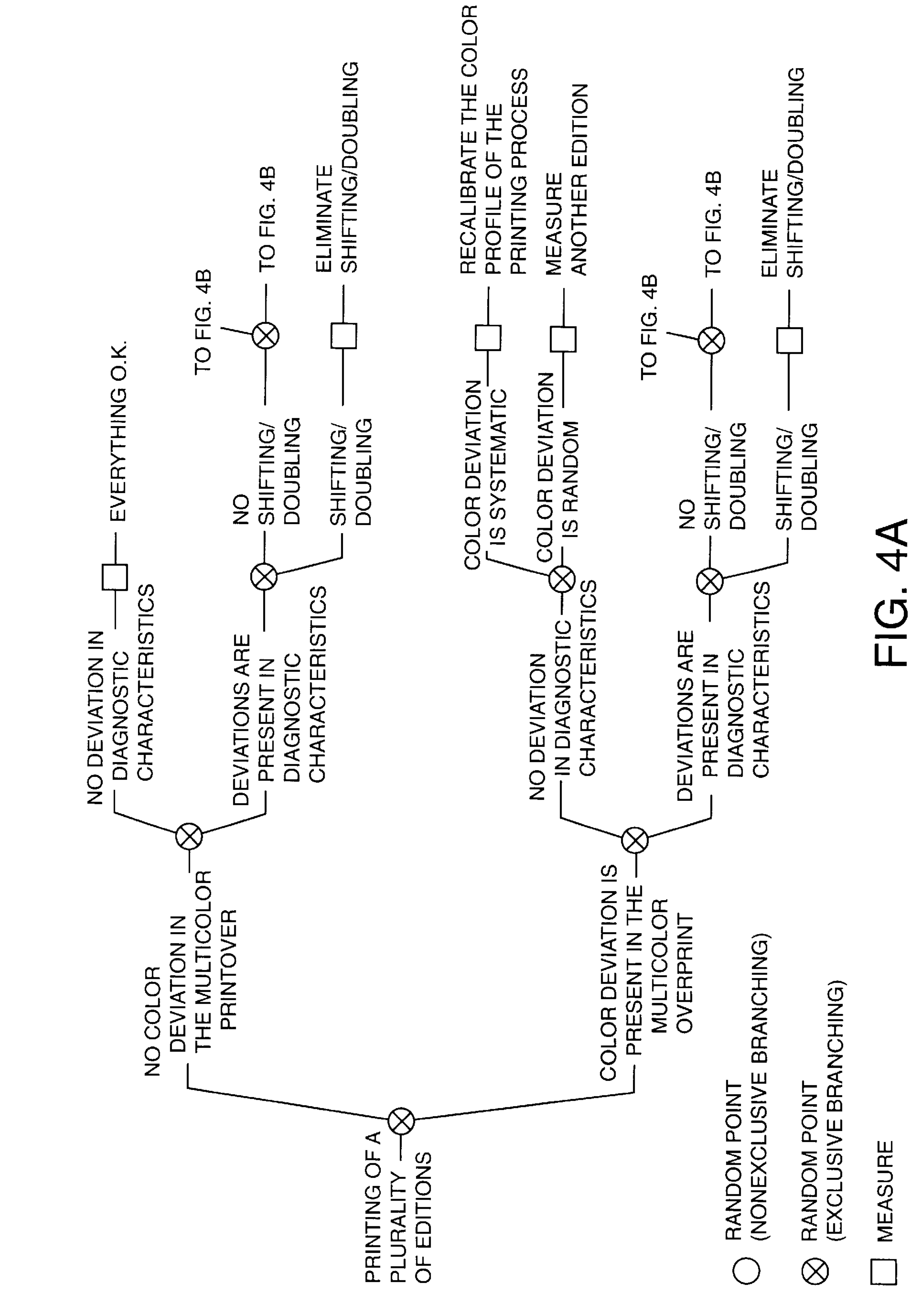
FIG. 4 is a decision tree for optimizing the color reproduction over a plurality of editions.
Figure 4B:
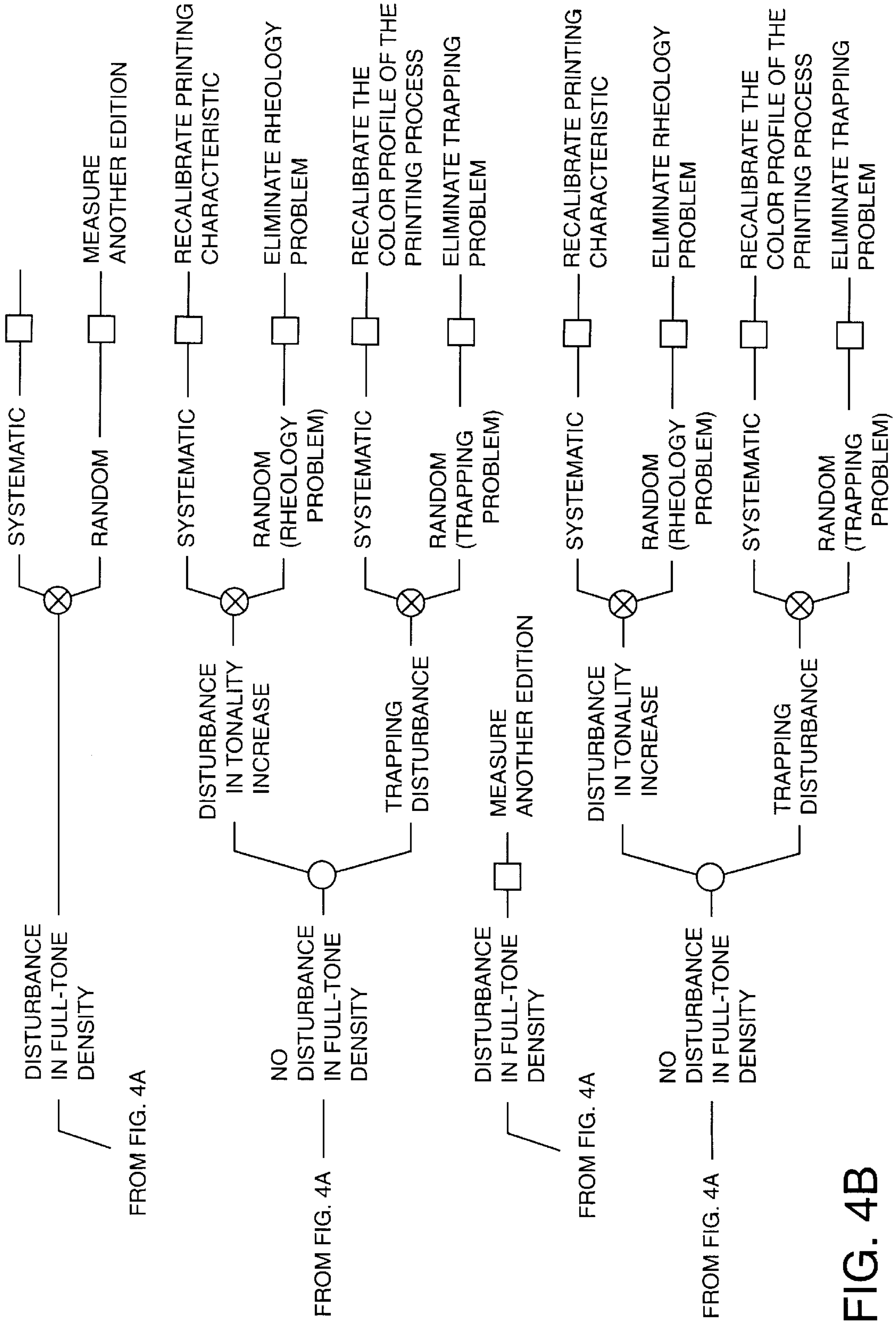

FIGS. 3 and 4 show decision trees, according to which a diagnosis can be made based on the quality data obtained. Optimization of the color reproduction in the multicolor printing of single editions is also possible based on these decision trees. The decision trees shown can be further refined by including additional quality data, e.g., the tristimulus values of the primary colors, data on ink and water control on the printing press, the temperature of the ink material, the temperature and humidity of the air, or image data of the printed subject.

It shall be noted, in general, that color deviations can be corrected by adjusting the ink and/or moistening agent control on the printing press. As an alternative or in addition to this, it is possible to make specific corrections during the preparation of the color separations in the preliminary printing stage (tonality compensation). While adjustment of the printing press is also suitable for compensating short-term variations in color reproduction, the tonality compensation in the preliminary printing stage is suitable for correcting systematic color deviations or color deviations varying over the long term.

Concerning preferred measuring fields and processes for such corrections, reference is made to DE 44 02 784 A1 and DE 44 02 828 A1.

In generating a diagnosis based on the quality data obtained, distinction should therefore be made between these two strategies. Two decision situations are involved, namely, the optimization of the color reproduction in a single edition, on the one hand, and the optimization of the color reproduction over a plurality of editions. FIG. 3 correspondingly shows a decision tree for the printing of one edition, and FIG. 4 shows a decision tree for the printing of a plurality of editions.

The branchings represent random points. Based on the quality data determined, a decision is made at each branching to determine the path that will be followed to proceed farther to the right. There are both exclusive branchings, in which only one path leading further is to be followed, and nonexclusive branchings, in which progress is possible on more than one forward-leading path. It may happen during the optimization of the color reproduction over a plurality of editions (FIG. 4) that a color deviation is caused by a disturbance in the tonality increase and a trapping disturbance. Both the rheology problem causing the color deviation and the trapping disturbance can be eliminated in this case, i.e., there is a nonexclusive branching at the random point.

In the case of a disturbance, each path in the decision tree ends with a recommended action on the right-hand side. Depending on the situation, a correction of the color and moistening agent control or a combination of both corrections, the elimination of an ink material-related rheology problem, the elimination of a trapping disturbance, the elimination of shifting or doubling, the recalibration of the printing characteristics of the individual colors, or the recalibration of the color profile in the sense of Color Management may be considered.

The decision trees according to FIGS. 3 and 4 are read in pseudocode as follows:

```
CASE
¦ Optimization of the color reproduction in one edition
    IF color deviation is present in the multicolor printover
      IF shifting/doubling is present
        IF shifting/doubling during the printing of edition can
          be eliminated
          Eliminate shifting/doubling
        ELSE    (shifting/doubling during printing of edition
                        cannot be eliminated)
          Correct color and/or moistening agent control
        END
      ELSE                  (no shifting/doubling)
      Corrcct color control and/or moistening agent control
      END
    ELSE                    (No color deviation in multicolor printover)
      everything is O.K.
    END
¦ Optimization of the color reproduction over one edition:
    IF color deviation is present in multicolor printover
      IF deviations are present in diagnostic characteristics
        IF shifting/doubling is present
          Eliminate shifting/doubling
        ELSE                (No shifting/doubling)
          IF disturbance is present in full tone density
            Measure another edition
        ELSE                (no disturbance in full-tone density)
          IF disturbance is present in tonality increase
            IF disturbance in tonality increase is
              systematic
              Recalibrate printing: characteristic
            ELSE            (random, rheology problem)
              Eliminate rheology problem
            END
          END
            IF trapping disturbance is present
            IF trapping disturbance is systematic
              Recalibrate the color profile of the
              printing process
            ELSE            (random, trapping problem)
              Eliminate trapping problem
            END
          END
        END
      END
    ELSE                    (No deviations in diagnostic characteristics)
      IF color deviation in multicolor overprint is
        systematic
        Recalibrate the color profile of the printing
        process
      ELSE                  (color deviation is random)
        Measure another edition
      END
    END
ELSE                        (no color deviation in multicolor overprint)
    IF deviations are present in diagnostic
      characteristics
      IF shifting/doubling is present
        Eliminate shifting/doubling
      ELSE                  (No shifting/doubling)
        IF shifting is present in full-tone density
          IF disturbance in full-tone density is
            systematic
            Recalibrate the colorprofile of the
            printing process
          ELSE              (the disturbance in the full-tone
                                density is random)
            Measure another edition
          END
        ELSE                (No disturbance in full-tone density)
          IF disturbance is present in tonality
            increase
              IF disturbance in tonality value
                increase is systematic
                Recalibrate printing characteristic
              ELSE          (disturbance in tonality value
                                increase is random,
                                rheology problem)
                Eliminate rheology problem
              END
```

-continued

```
            END
            IF trapping disturbance is present
              IF trapping disturbance is
                systematic
                recalibrate the color profile of the
                printing process
              ELSE          (random, trapping problem)
                Eliminate trapping problem
              END
            END
          END
        END
      ELSE                  (no deviations in diagnostic characteristics)
        Everything is O.K.
      END
    END
END
```

A further differentiation of the recommended actions is also possible. For example, the instruction to eliminate shifting or doubling may also be supplemented with an indication of possible causes, e.g., the web tension, the properties of the paper, or the properties of rubber blankets.

Both decision trees represented as examples show how a quality evaluation and, in the case of excessively great deviations, a diagnosis associated with a recommended action are automatically generated by an effective and expressive data compression. It is not sufficient to automatically calculate and output the known, edition-related statistical characteristics, such as a minimum, maximum, mean value and dispersion, e.g., for each feature.

It is possible to combine the conventional tools of optimization of the color reproduction, which are based on densitometry and colorimetry, with the new tools of Color Management in an overall system by the use of measuring fields according to the present invention or of compact measuring field blocks or of a combination thereof in conjunction with image analysis and decision tree.

Should the quality data have a high level of noise, i.e., should they contain practically only random deviations, it is no longer possible to unambiguously deduce a recommended action. Measurement is continued in this case, or additional quality data are used. The situation should be mentioned as an example in which color deviations which are not reproducible occur in multicolor printover over a plurality of editions. Additional editions are now printed and measured.

Neuronal networks or algorithms of fuzzy logic, or a combination thereof may also be used as an alternative to deduce the diagnosis and the recommended actions. The neuronal networks have, in particular, the advantage of being able to be trained on the basis of test patterns.

If the correct recommended actions are known for each set of quality data, the expert knowledge necessary for making a diagnosis can be communicated to such a network, without sharp set values or tolerance having to be set for the features in advance. Such a procedure is very advantageous due to the fact that the numerical expert knowledge occurs mainly in the nonsharp rather than the sharp form.

Figure 5:
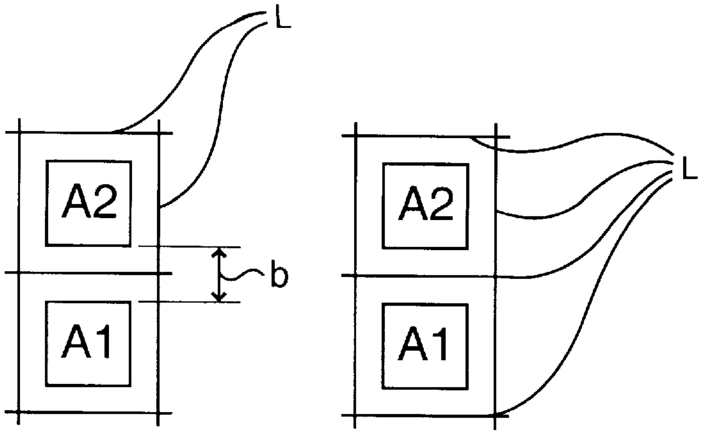
FIG. 5 is a schematic view of two measuring field block with integrated lines for determining register values.

FIG. 5 shows two measuring field blocks with integrated lines L. Each of the two measuring field blocks has two measuring fields A1 and A2 arranged in the circumferential direction of a printing cylinder one behind the other or in the longitudinal direction of the printing cylinder. The two measuring fields A1 and A2 may be, e.g., two individual color full-tone fields or two individual color half-tone fields in two different primary colors. The measuring fields A1 and A2 may be formed in the manner of the measuring field according to FIG. 1, i.e., with a color-measuring surface F and lateral color strips S. However, they may also be designed without lateral color strips as exclusive color-measuring surfaces F.

The two measuring field blocks according to FIG. 5 contain, in addition to those according to FIGS. 2A through 2D, two groups of lines L. One group of lines L points in the circumferential direction, and the other at right angles thereto, in the longitudinal direction of the printing cylinder, i.e., in the lateral direction.

Two lines each are provided for the circumferential register and the side register in the measuring field block that is the left-hand block in FIG. 5. The four lines L of the left-hand measuring field block are already completely sufficient for determining register deviations in the circumferential and lateral directions in the case of a two-color printing. One of the two Lines L extending in the circumferential direction and one of the two lines L extending in the lateral direction in the reference color and the respective other line in the additional primary color to be coordinated in good register are printed. The area enclosed between the two lines L is measured, in general, from the measurement of the distance between the two lines L extending in the same direction, if the register deviation, i.e., the register mark, is determined.

The right-hand measuring field block in FIG. 5 has a third line L for the determination of register deviations in the circumferential direction. Two of the three lines L extending in the circumferential direction are printed in the reference color, and the third, in the additional primary color. Only two lines L, one for the reference color and one for the additional primary color, are in turn provided in the lateral direction. By printing together two lines L in the measuring field block for the reference color in the circumferential direction, a compensation of the measurements can be performed by the evaluation process independently from the measuring instrument. Based on the two lines L in the reference color, i.e., because of the reference measurement, the process "knows" how strongly the measured values recorded for the additional primary color deviate from the set point.

The two measuring field blocks according to FIG. 5 represent minimal configurations, in the sense that for the determination of a register deviation, at least two lines L are provided for each direction in which a register deviation shall be determined. These may be the only two primary colors in the case of a two-color print, or any two primary colors if more than only two different primary colors are used in the print. A plurality of measuring field blocks in the manner of FIG. 5 would be necessary in the latter case to determine the register values or register deviations for all the primary colors used based on integrated lines L.

Figure 6:
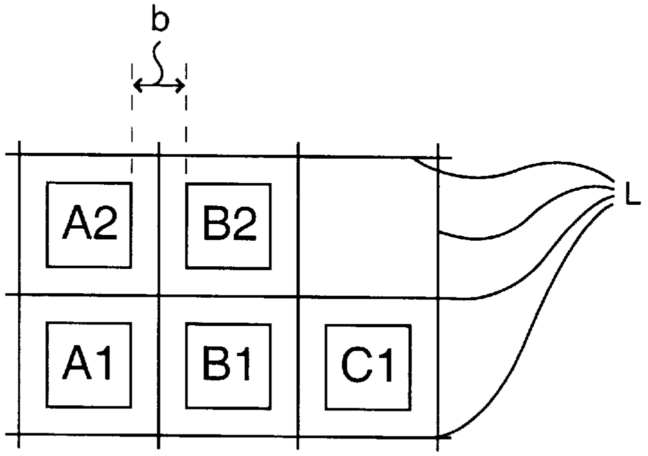
FIG. 6 is an expression of the measuring field blocks according to FIG. 5.

FIG. 6 shows an expansion of the measuring field blocks shown in FIG. 5. All register values can already be determined in the lateral direction with the measuring field block according to FIG. 6 in the case of four-color printing if at least one line L is provided of the lines L shown in FIG. 6 in the lateral direction in each of the four primary colors, including black.

If the measuring field block according to FIG. 6 is a measuring field block for a two-color printing, two of the total of five measuring fields shown are designed as individual color full-tone fields, another two as individual color half-tone fields, especially half-tone fields, and the fifth field as a suitable combination measuring field. Thus, the measuring field block according to FIG. 6 would already provide all the interesting register values and a wealth of densitometric and calorimetric values with a single scanning. Furthermore, at least two lines L each are printed in the reference color in both directions in this case.

Figure 7:
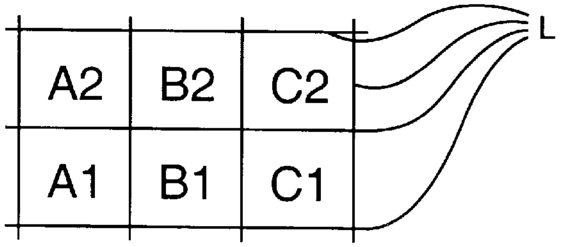
FIG. 7 is a schematic view of a variant of the measuring field blocks with integrated lines.

While there remain narrow unprinted zones of width b between adjacent measuring fields in the measuring field blocks according to FIGS. 5 and 6, and the lines L extend centrally between these zones, assuming exact register, the measuring fields in the measuring field block according to FIG. 7 are moved closer together to the extent that, assuming exact register, they join the lines L passing through between them bluntly or flush. No unprinted area is left between the measuring fields A1 through C2 in the measuring field block according to FIG. 7. More measuring block surface can thus be saved, but the noise component in the measured signal is increased compared with the measuring field blocks according to FIGS. 5 and 6.

The distance b between two adjacent measuring fields ideally equals about 0.5 mm with lines L having a width of about 0.1 mm, i.e., the distance between the lines L and the corresponding adjacent measuring fields is about 0.2 mm in this case. The distance b should not be greater than about 1 mm, and it also should not be less than about 0.1 mm in order to obtain possibly noise-free measured signals.

Figure 8:
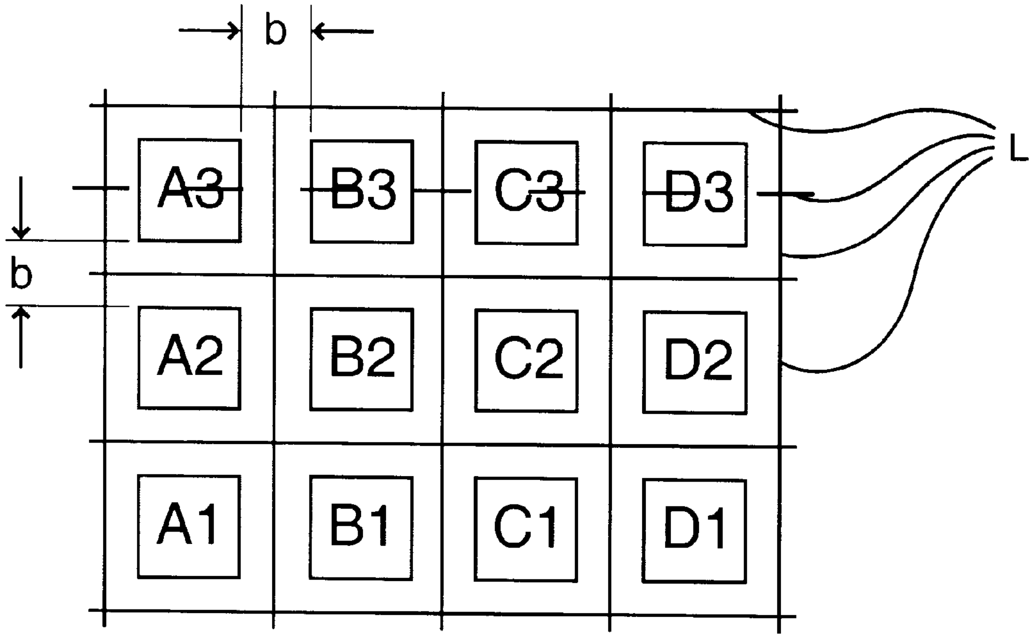
FIG. 8 is the measuring field block according to FIG. 2A with integrated lines.

FIG. 8 shows a measuring field block with integrated lines L, whose measuring fields A1 through D3 have the same color occupation as those of the measuring field block according to FIG. 2A. However, the measuring fields A1 through D3 of the block according to FIG. 8 are designed only as color-measuring fields F, i.e., A1 through A3 have no lateral color strips S. At least one line L is integrated in the measuring field block for each of the printing inks for each of the two directions in which the register deviations shall be determined. In the arrangement of a 3×4 measuring field block shown, five lines L can be provided in the measuring field block in one of the two directions in a space-saving manner, and four lines L can be provided in the other direction, so that two of the lines L extending in one of the two directions can be printed in the reference color. Additional lines may be provided, e.g., between lines L extending adjacent to one another. Such an additional line L is indicated by broken line in FIG. 8.

Figure 9:
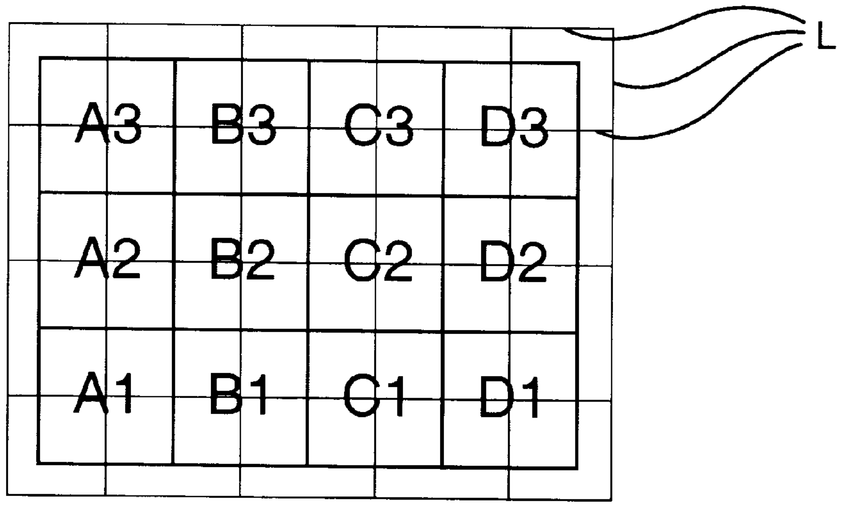
FIG. 9 is a schematic view of a variant of the measuring field block according to FIG. 8.

FIG. 9 shows as another embodiment variant a measuring field block in which the measuring fields A1 through D3 directly abut against each other, assuming exact register. The lines L extend across the measuring fields A1 through D3. Even though the measuring field block according to FIG. 9 is especially compact, like the block according to FIG. 7, the measured value signals for determining the register deviations still contain comparatively high noise levels, which are to be filtered out by corresponding evaluation processes.

Figure 10:
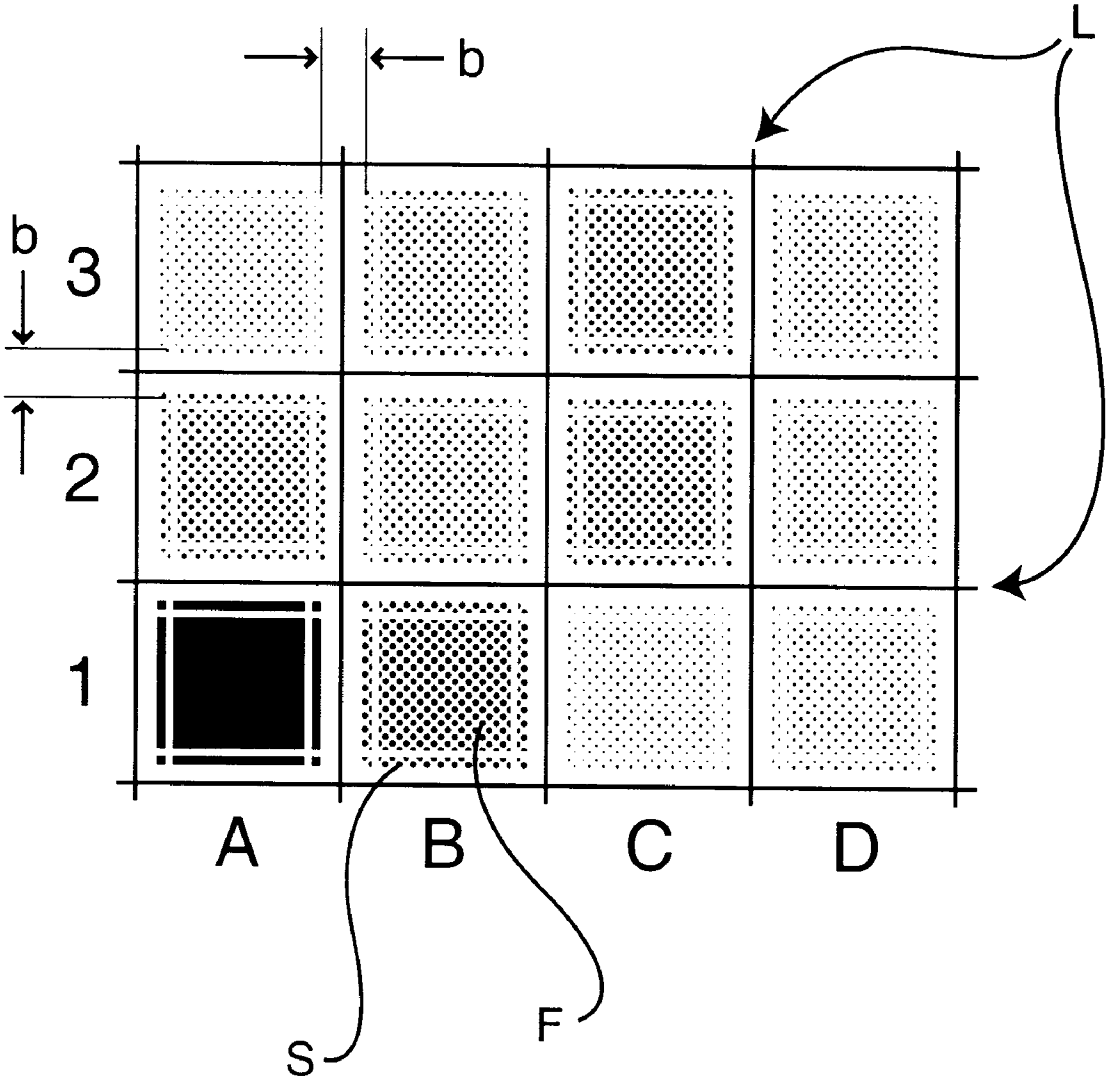
FIG. 10 is the measuring field block according to FIG. 2A with integrated lines.

Finally, FIG. 10 shows a measuring field block, whose measuring fields A1 through D3 exactly correspond to those of the measuring field block according to FIG. 2A. However, the measuring fields adjacent to one another are arranged at uniformly spaced locations from one another in the case of exact register mark, so that unprinted strips are left between the columns and rows of the measuring fields. All of these linear strips preferably have the same width b. The integrated lines L for determining the register deviations of the two additional primary colors from the reference color extend within the unprinted strips; they preferably extend centrally through the strips. The measuring field block according to FIG. 10 corresponds to that according to FIG. 8, with the difference that in addition to the lines L, the individual measuring fields A1 through D3 have lateral color strips, i.e., they correspond, individually with different color occupations, to the measuring field according to FIG. 1.

The lines L in the measuring field block according to FIG. 10 are preferably used to determine the register values, and the lateral color strips S are preferably used to determine shifting and/or doubling values.

Both the measuring fields and the lines L in the measuring field blocks according to FIGS. 5 through 10 form grids, whose rows and columns or whose lines point in the circumferential direction and in the lateral direction. The two grids are placed one over the other. Furthermore, the lines L in the circumferential direction and also those in the lateral direction are arranged in parallel to and at equally spaced locations from one another. Other arrangements of the lines L are possible, in principle, but the exact alignment in the circumferential and lateral directions as well as parallelism and equidistance is preferred. However, deviations from these individual features are possible in the specific case of application.

While specific embodiments of the invention have been shown and described in detail to illustrate the application of the principles of the invention, it will be understood that the invention may be embodied otherwise without departing from such principles.

What is claimed is:

1. A measuring field block for detecting quality data in the multicolor printing of single editions, comprising:
   - optically scannable measuring fields printed on the printed product, said measuring fields each having at least one color-measuring surface for determining a color density, a surface coverage or a tristimulus value for each of said measuring fields, each measuring field having a minimum dimension for allowing measurement of surface coverage; and
   - lines in primary colors printed on the printed product for the simultaneous determination of values for a register deviation, said measuring fields and said lines printed in primary colors being arranged in a common measuring field block such that at least a part of one of said measuring fields being located between adjacent said lines printed in primary colors.

2. The measuring field block in accordance with claim 1, wherein at least one of said lines extends between at least two adjacent said measuring fields of the measuring field block.

3. The measuring field block in accordance with claim 1, wherein at least in the case of exact register, an unprinted, strip-shaped area is provided directly on both side of at least one of said lines.

4. The measuring field block in accordance with claim 1, wherein at least one of said lines extends through at least one of said measuring fields of the measuring field block.

5. The measuring field block in accordance with claim 1, wherein at least one of said lines is provided in each of the primary colors (yellow, magenta and cyan) for at least one direction, in which a register deviation shall be determined.

6. The measuring field block in accordance with claim 1, wherein at least two lines are provided in a primary color used as a reference color for at least one direction, in which a register deviation shall be determined.

7. The measuring field block in accordance with claim 1, wherein in the case of exact register, said lines point, extending in parallel at equally spaced locations, in a first direction and a second direction directed at angles thereto, wherein at least one said lines is provided in each of the two directions in each of the primary colors (yellow, magenta and cyan).

8. The measuring field block in accordance with claim 1, wherein one of said measuring fields has a measuring field edge with a defined course relative to a direction of printing and further comprising: at least one lateral color strip, said lateral color strip being printed in the same print together with said color-measuring surface associated with said measuring field edge, said lateral color strip being narrow in relation to dimensions of said color-measuring surface, and extending at a short lateral distance from said measuring filed edge wherein a nominal surface remaining ink-free in a print, between said measuring field edge and said strip is comparable to the corresponding actual surface.

9. The measuring field block in accordance with claim 1, wherein said measuring fields have at least two lateral color strips each for determining shifting and doubling in a print roller circumferential direction and a roller lateral direction.

10. The measuring field block in accordance with claim 8, wherein said color-measuring surface and said color strip of are separated from one another by a color-free zone.

11. The measuring field block in accordance with claim 8, wherein said color strip extends linearly and in parallel to an edge of said color-measuring surface.

12. The measuring field block in accordance with claim 8, wherein said color-measuring surfaces and said color strips are rectangular.

13. The measuring field block in accordance with claim 8, wherein said color-measuring surfaces have a color strip close to each of their edges.

14. The measuring field block in accordance with claim 8, wherein, in the case of exact circumferential and side registration, said measuring fields form a compact measuring field block, with said measuring fields bluntly abutting against each other with said lateral color strips being one of at a closely spaced location from one another or at a predetermined distance.

15. The measuring field block in accordance with claim 1, wherein said measuring fields include individual color full-tone fields provided in the primary colors (cyan, magenta, yellow, black).

16. The measuring field block in accordance with claim 1, wherein said measuring fields include individual color half-tone fields, in which one each of the primary colors (cyan, magenta, yellow, black) is printed with its nominal degree of surface coverage.

17. A process for detecting quality data in the multicolor printing of single editions, comprising the steps of:
   - printing color-measuring fields with a printing press, which contain at least individual color measuring fields in the primary colors (cyan, magenta, yellow), and which each have at least one color-measuring surface of a minimum dimension suitable for obtaining tristimulus values or color density values or surface coverages;
   - printing lines with a printing press in the primary colors (cyan, magenta, yellow) and black, said printing color-measuring fields and said printing lines forming a common measuring field block with said measuring fields printed in different colors and said lines printed in different primary colors in said common measuring field block, wherein at least part of said measuring fields is located between adjacent said lines;
   - optically scanning said common measuring field block;
   - evaluating the remitted light;
   - based on said step of evaluating determining at least one of tristimulus values or color density values or surface coverages for said measuring fields; and
   - determining register values by measuring the relative location of said lines.

* * * * *